(12) United States Patent
Hsieh et al.

(10) Patent No.: US 11,308,883 B2
(45) Date of Patent: Apr. 19, 2022

(54) TEMPERATURE BASED OLED SUB-PIXEL LUMINOSITY CORRECTION

(71) Applicant: Hewlett-Packard Development Company, L.P., Spring, TX (US)

(72) Inventors: Hsing-Hung Hsieh, Taipei (TW); Cheng-Hua Yu, Taipei (TW); Ann Alejandro Villegas, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,692

(22) PCT Filed: Sep. 26, 2018

(86) PCT No.: PCT/US2018/052919
§ 371 (c)(1),
(2) Date: Oct. 19, 2020

(87) PCT Pub. No.: WO2020/068067
PCT Pub. Date: Apr. 2, 2020

(65) Prior Publication Data
US 2021/0241693 A1    Aug. 5, 2021

(51) Int. Cl.
*G09G 3/32* (2016.01)
*G09G 3/3258* (2016.01)

(52) U.S. Cl.
CPC ..... *G09G 3/3258* (2013.01); *G09G 2320/041* (2013.01); *G09G 2360/16* (2013.01)

(58) Field of Classification Search
CPC ........... G09G 3/3258; G09G 2320/041; G09G 2360/16; G09G 3/30; G01K 11/16
See application file for complete search history.

(56) References Cited

U.S. PATENT DOCUMENTS

| 6,376,994 B1* | 4/2002 | Ochi ................. G09G 3/3216 315/169.1 |
| 6,414,661 B1* | 7/2002 | Shen ................. G09G 3/3208 345/82 |
| 7,224,332 B2* | 5/2007 | Cok ................. G09G 3/3216 345/211 |
| 8,279,138 B1* | 10/2012 | Margulis ............. G09G 3/03 345/1.1 |

(Continued)

FOREIGN PATENT DOCUMENTS

RU    2009142408 A    5/2011
RU    2009142410 A    5/2011

*Primary Examiner* — Jose R Soto Lopez
(74) *Attorney, Agent, or Firm* — Brooks Cameron & Huebsch PLLC

(57) ABSTRACT

In an example implementation according to aspects of the present disclosure, a system including a controller to receive a temperature value, from a temperature sensor corresponding to a sub-pixel in an organic light emitting display. The controller calculates a luminous value of the sub-pixel based on the temperature value and a function corresponding to a degradation of luminosity over time and temperature. The controller determines, based on the luminous value, a corrected luminous value corresponding to a target luminous value. The controller retrieves a voltage value from a second database, wherein the second database comprises a luminous-voltage relationship. The controller applies the voltage value to the sub-pixel.

15 Claims, 5 Drawing Sheets

(56) References Cited

U.S. PATENT DOCUMENTS

| | | | |
|---|---|---|---|
| 8,907,991 B2* | 12/2014 | Jaffari | G09G 3/3291 345/690 |
| 9,177,503 B2* | 11/2015 | Lynch | G09G 3/3225 |
| 10,255,881 B1* | 4/2019 | Patel | G09G 3/20 |
| 2005/0030267 A1* | 2/2005 | Tanghe | G09G 3/3216 345/82 |
| 2005/0039267 A1 | 2/2005 | Kvita et al. | |
| 2005/0248517 A1* | 11/2005 | Luther Weindorf | G09G 3/3208 345/82 |
| 2008/0055318 A1* | 3/2008 | Glen | G09G 3/20 345/501 |
| 2008/0088648 A1* | 4/2008 | Nathan | G09G 3/3241 345/690 |
| 2008/0165108 A1* | 7/2008 | Shen | G09G 3/3614 345/94 |
| 2014/0306868 A1* | 10/2014 | Chaji | G09G 3/3291 345/77 |
| 2014/0356843 A1* | 12/2014 | Yang | G06F 3/0488 434/362 |
| 2016/0035281 A1* | 2/2016 | Jeon | G09G 3/006 345/690 |
| 2016/0123817 A1* | 5/2016 | Bennett | H01L 27/1225 345/156 |
| 2016/0240128 A1* | 8/2016 | Kim | G09G 3/3233 |
| 2016/0240140 A1* | 8/2016 | Park | G09G 3/3258 |
| 2017/0004765 A1* | 1/2017 | Tani | G09G 3/3233 |
| 2017/0076659 A1* | 3/2017 | Zhang | G09G 3/3208 |
| 2017/0213493 A1* | 7/2017 | Han | G09G 3/3208 |
| 2018/0366061 A1* | 12/2018 | Furukawa | G09G 3/30 |
| 2019/0189042 A1* | 6/2019 | Aurongzeb | G06F 1/1637 |
| 2020/0060004 A1* | 2/2020 | Baumheinrich | G02F 1/00 |
| 2020/0266252 A1* | 8/2020 | Cancel Olmo | H04N 5/89 |
| 2020/0279519 A1* | 9/2020 | Oho | G09G 3/3233 |
| 2020/0349884 A1* | 11/2020 | Lai | G01R 31/26 |
| 2020/0357336 A1* | 11/2020 | Xu | G09G 3/3233 |
| 2021/0012715 A1* | 1/2021 | Ueno | G09G 3/3233 |

* cited by examiner

TEMPERATURE BASED OLED SUB-PIXEL LUMINOSITY CORRECTION

BACKGROUND

Organic light emitting diodes (OLEDs) are often used as individually controlled light elements in display assemblies. OLEDs sub-pixels are controlled to provide differing values across a display assembly to reproduce a visual image.

DETAILED DESCRIPTION

Organic light emitting diodes (OLED) are utilized in displays for devices in may form factors, including but not limited to laptop displays, desktop computer displays, televisions, and mobile devices. In displays, OLEDs may correspond to sub-pixels. The sub-pixels are controlled and coordinated to illuminate at a precise luminous value to create an actual reproduction of an image. Over time and in response to temperature exposure, OLED sub-pixel luminosity may degrade. Described herein is temperature-based OLED sub-pixel luminosity correction.

Figure 1:
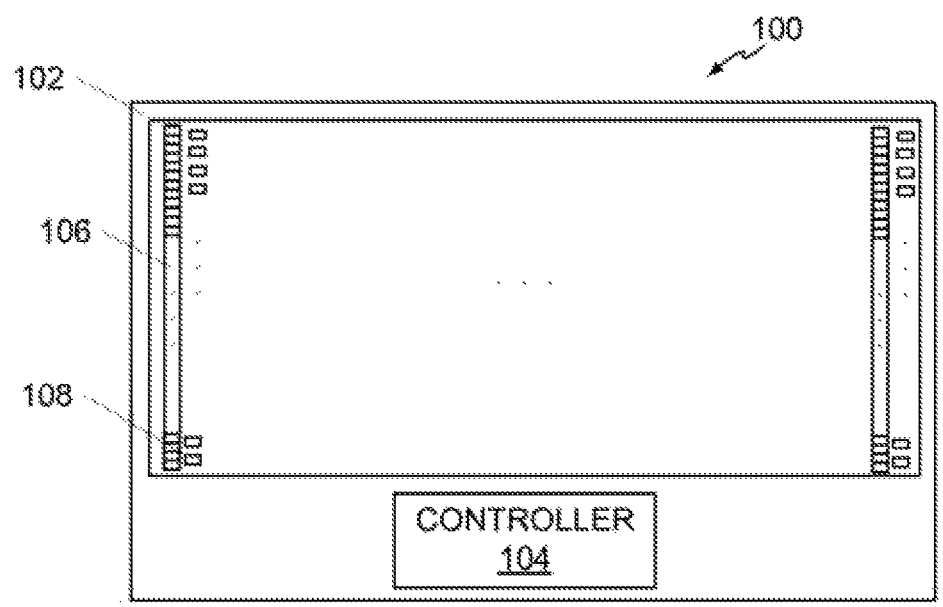
FIG. 1 illustrates a display featuring temperature-based OLED sub-pixel luminosity correction according to an example.

FIG. 1 illustrates a display featuring temperature-based OLED sub-pixel luminosity correction according to an example. FIG. 1 represents a system 100 including a display 102, an array of OLED sub-pixels 106, temperature sensors 108 and a controller 104. The display 102 may be an integrated display for use in computer display systems, such as laptops, desktops, and mobile devices. The display 102 may have integrated temperature sensors 108 or communicatively coupled temperature sensors 108.

The array of OLED sub-pixels 106 may cover the entire surface of the display 102. The use of the display 102 may be determinative as to the number and layout of OLED sub-pixels in the array of OLED sub-pixels 106. For example, a laptop display for a high-end laptop may include more OLED sub-pixels 106 than for an entry level mobile device, like a flip phone. The array of OLED sub-pixels 106 may be communicatively coupled to a controller 104. The controller 104 signals each of the sub-pixels in the array of OLED sub-pixels 106 by applying voltage. The controller 104 determines the voltage based on the intended image to be displayed.

Communicatively coupled to the controller 104 may be temperature sensors 108. The temperature sensors 108 may be integrated into the display 102 itself or alternatively positioned during a sub component assembly process. In one implementation, the temperature sensors 108 may be implemented with each OLED sub-pixel in the OLED sub-pixel array in a one-to-one relationship. In this implementation, each of the temperature sensors 108 may provide accurate temperature readings corresponding to the related OLED sub-pixel. In another implementation, the temperature sensors 108 may be implemented in a one-to-many relationship with each OLED sub-pixel in the OLED sub-pixel array 106. In this implementation, the temperatures sensors 108 may be placed periodically within the OLED sub-pixel array. The periodic placement may be equidistant from each temperature sensor 108 as to provide complete coverage of temperature readings across the OLED sub-pixel array. In yet another implementation, the temperature sensors 108 may be disposed at an edge of the OLED display. The received temperature value may be based on an interpolation between readings from a first temperature sensor and a second temperature and sensor on the OLED display. The second temperature sensor may be placed on the opposite edge of the display from the first temperature sensor. The temperature sensors 108 may include but are not limited to thermistors, thermocouples, resistance thermometers, and silicon bandgap temperatures sensors.

The controller 104 may utilize the temperature sensors 108 to control the OLED sub-pixels. The controller 104 may receive a temperature value corresponding to a sub-pixel from the temperature sensor 108. Alternatively, the controller 104 may interpolate a temperature corresponding to the OLED sub-pixel based on temperature reading between to temperature sensors. In an implementation utilizing interpolation, the controller 104 may use linear interpolation to determine an approximated temperature for an OLED sub-pixel based on the distance between the two temperature sensors and the OLED sub-pixel. Additional temperature sensors and corresponding values may be utilized to further refine the temperature interpolation utilizing high level forms of interpolation (e.g. bilinear).

The controller 104 may determine a luminous value of the sub-pixel based on the temperature value and a database corresponding to luminosity over time and temperature. The database may include historical measured values of luminosity over time and temperature. The database may include laboratory measured values of luminosity of an OLED sub-pixel over time and temperature. Alternatively, the database may include functionally extrapolated values of luminosity over time and temperature. The extrapolated values may correspond directly or indirectly to OLED sub-pixel decay over time under various temperature conditions. The database may be implemented as an in-memory or on-disk or a combination of both techniques. Alternatively, the database may reside remotely from the system and the controller 104 accesses the database through a network enabled application programming interface.

The controller 104 may determine, based on the luminous value, a corrected luminous value corresponding to a target luminous value. The luminous value may correspond to an actual luminosity of the OLED sub-pixel. The target luminous value may correspond to a desired luminosity within the display to maintain continuity between all OLED sub-pixels within the array of the display. The corrected luminous value may be a delta between the luminous value and the target luminous value.

The controller 104 may determine a voltage value based on the corrected luminous value and the luminous value. The voltage value may be a delta corresponding to a change in voltage from the supplied voltage, or the voltage value may be a directed value corresponding to the correct total voltage to be applied to the OLED sub-pixel to achieve the target luminous value. A voltage value may be retrieved from a second database which includes entries corresponding to a luminous-voltage relationship. The database may include historical measured values of luminosity versus voltage. The database may include laboratory measured values of luminosity of an OLED sub-pixel over time and temperature. Alternatively, the database may include functionally extrapolated values of luminosity over voltage. As with the luminosity versus time and temperature database, the luminous-voltage database may be implemented as an in-memory or on-disk or a combination of both techniques. Also, the database may reside remotely from the system and the controller 104 accesses the database through a network enabled application programming interface. In a network enabled database implementation, the database may receive periodic updated values, which then may trickle down to the controller 104 for more accurate results.

Once the controller 104 has received the voltage value, the controller 104 may apply the voltage value to the OLED sub-pixel. In one implementation, the voltage value may be utilized to increase the voltage to the OLED sub-pixel an amount corresponding to the additional voltage value. Alternatively, the controller 104 may apply the voltage value directly to the OLED sub-pixel, as the voltage value in this implementation is not an offset and is the correct voltage to drive the target luminous value.

Figure 2A:
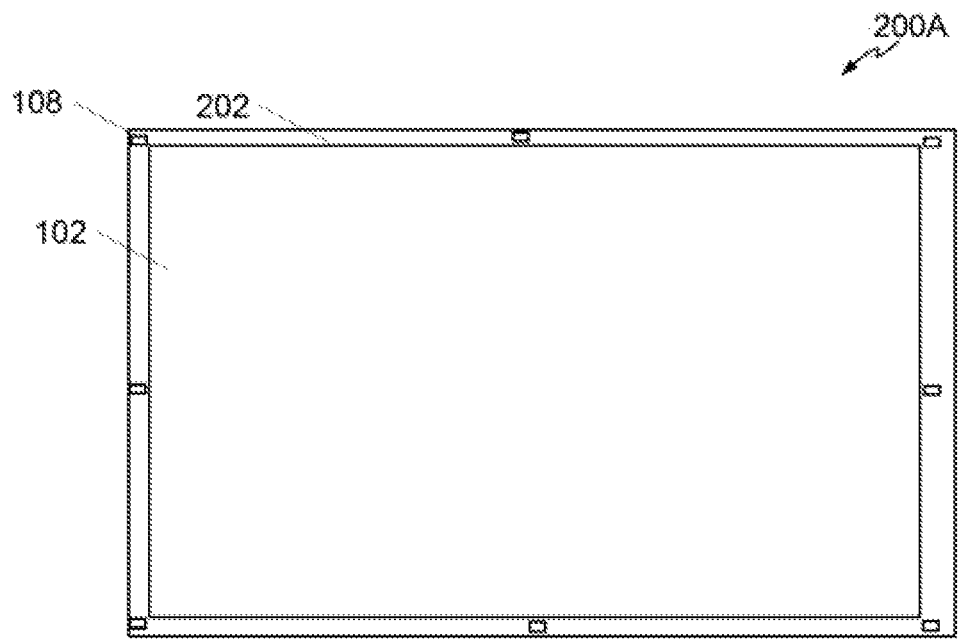
FIGS. 2A and 2B illustrate temperature sensor configurations of a display according to an example.

FIG. 2A illustrates a temperature sensor configuration 200A of a display according to an example. The temperature sensor configuration 200A of the temperatures sensors 108 may be in relation to the display 102. In this configuration 200A, the temperature sensors 108 may be positioned exterior to the perimeter of the display 102. This configuration 200A allows temperature sensors 108 to be added as a subcomponent assembly and the usage of an off-the-shelf display 102 assembly. For more accurate temperature readings, both the temperatures sensors 108 and the display 102 may be mounted to a thermally conductive surface 202. A thermally conductive surface 202 may allow heat from the OLED sub-pixels within the display 102 to be more effectively transferred to the temperature sensors 108.

Figure 2B:
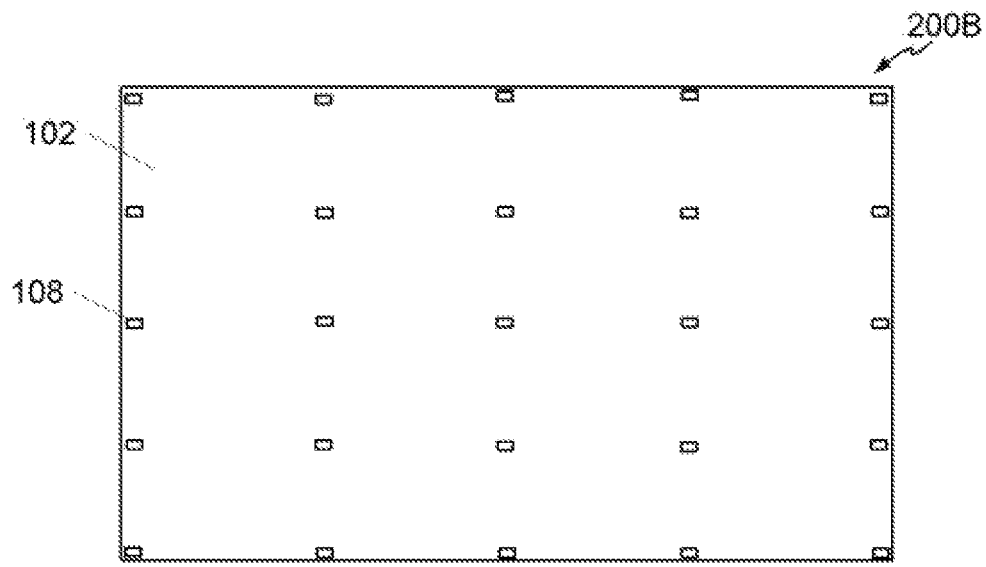

FIG. 2B illustrates a temperature sensor configuration 200B of a display according to another example. The temperature sensor configuration 200B of the temperature sensors 108 may be in relation to the display 102. In this configuration 200B, the temperature sensors 108 may be positioned interior to the perimeter of the display 102. This configuration 200B allows the temperature sensors 108 to be configured proximally closer to the OLED sub-pixels for which they read temperature values. The temperature sensors 108 may be placed equidistant from each other such that a uniform distribution across the display 102 may be achieved. The temperature sensors 108 may be placed on the back of the display 102 to avoid interfering with the transmittal of light from the OLED sub-pixels. It is to be appreciated that the number of temperature sensors 108 may vary from implementation to implementation including a up to a one-to-one relationship between OLED sub-pixel to temperature sensors configuration.

Figure 3A:
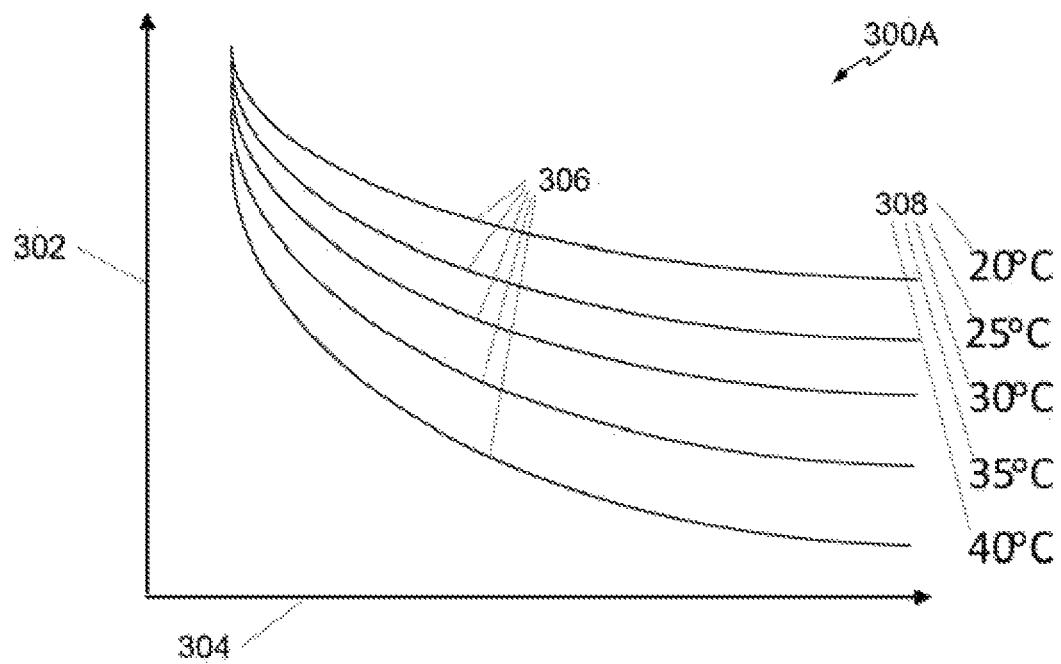
FIGS. 3A and 3B are diagrams illustrating relationships between luminosity, time and voltage, in accordance with an example of the present disclosure.

FIG. 3A is a diagram illustrating a relationship 300A between luminosity and time in accordance as an example of the present disclosure. In FIG. 3A luminosity 302 is represented as the y-axis of the diagram. Additionally, time 304 runs the x-axis of the diagram. Each curve 306 displayed in FIG. 3A is representative and may not correspond to actual values. Each curve 306 may correspond to a discrete temperature 308. At any point on each curve 306, an OLED sub-pixel may have a luminosity corresponding to the temperature history of the OLED sub-pixel. Each of the curves 306 may correspond to table in a database. Each table may include records corresponding to luminosity values and time.

Figure 3B:
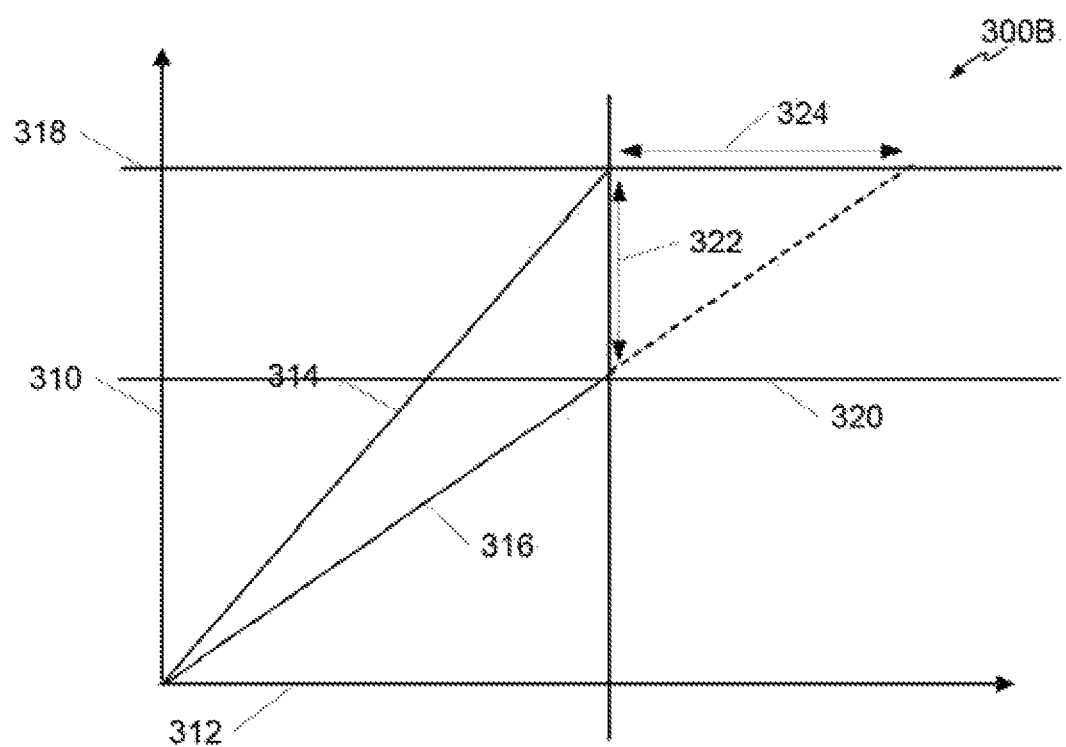

FIG. 3B is a diagram illustrating a relationship 300B between luminosity and voltage in accordance with an example of the present disclosure. In FIG. 3B luminosity 310 is represented as the y-axis of the diagram. Additionally, voltage 312 is represented as the x-axis of the diagram. An initial luminous value 314 demonstrates the base line performance of an OLED sub-pixel. Over time the luminosity of the OLED-subpixel at the same voltage decays. A decayed luminous value 316 is shown. The decayed luminous value 316 may need to be corrected. A target luminous value 318 may be identified. As illustrated in FIG. 3B, the target luminous value 318 also corresponds to the initial luminous line 314 at a specified voltage, however in other implementations the target luminous value 318 and the initial luminous line 314 may not coincide. The target luminous value 318 may be a desired luminous value for the OLED sub-pixel for conforming luminosity for surrounding OLED sub-pixels adjacent in the OLED sub-pixel array.

The current luminous value 320 of the OLED sub-pixel, as extracted out of the database corresponding to the illustration in FIG. 3A, may correspond to a luminous line 316 that has decayed. A luminous line 316 that has decayed may correspond to the current luminous value 320 that OLED sub-pixel produces at the same voltage as the target luminous value 318. A corrected luminous value 322 may be a delta between target luminous value 318 and current luminous value 320.

Similarly following the luminous line 316 to the target luminous value 318 a voltage value 324 may correspond to a delta between the voltage required to on the initial luminous line 314 and the luminous line 316. The above referenced lines may correspond as tables within a database. Each of the tables corresponds to a voltage entry on the line. The controller can index the target luminous value to retrieve the desired voltage. The controller can create the corrected luminous value 322 utilizing a luminous value out of the database corresponding to FIG. 3A. Based on the corrected luminous value and the target luminous value, the controller can look up the table corresponding to the voltage value 324 required for the OLED sub-pixel to exhibit the target luminous value.

Figure 4:
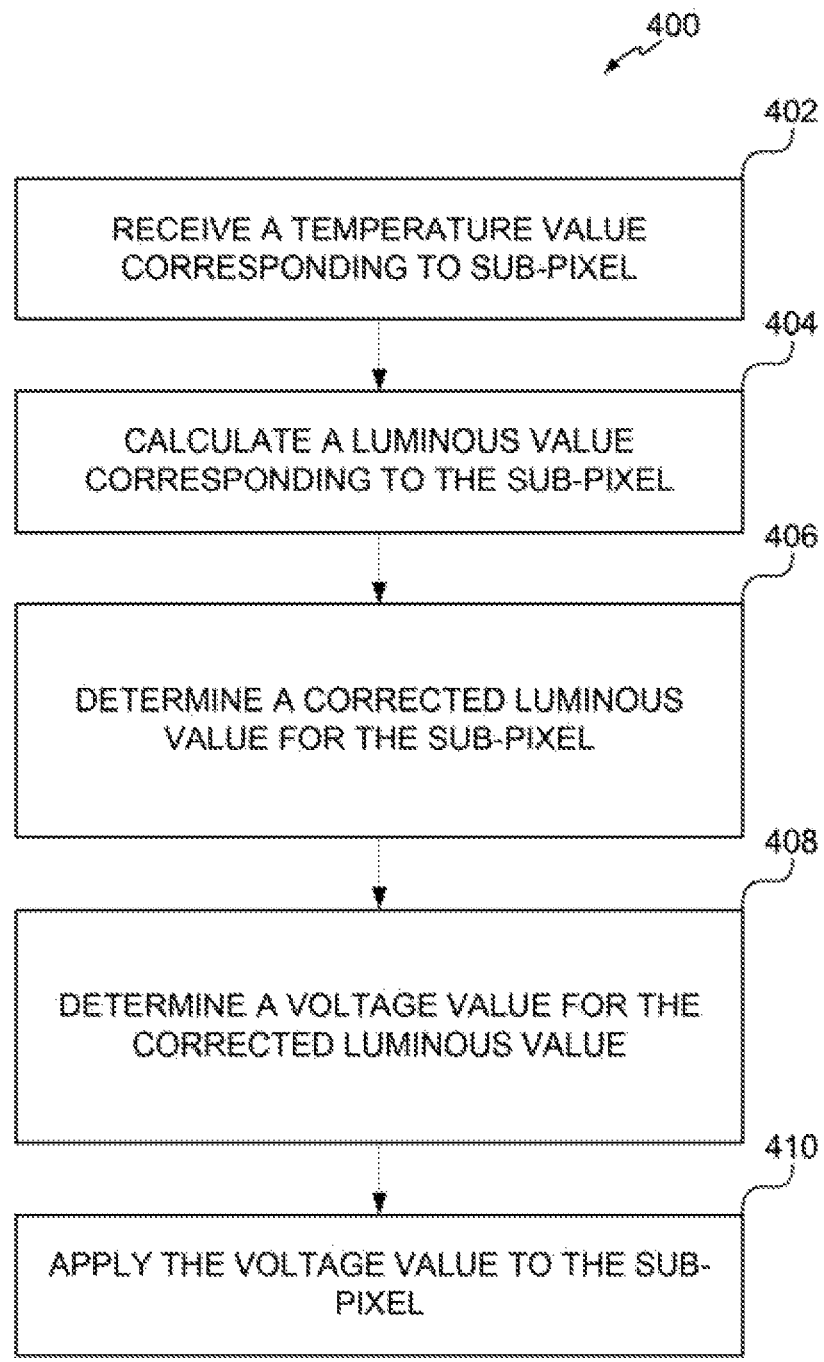
FIG. 4 is a flow diagram illustrating a method to correct OLED sub-pixel luminosity based on temperature, according to an example.

FIG. 4 is a flow diagram illustrating a method to correct OLED sub-pixel luminosity based on temperature, according to an example.

At step 402, the controller, receives a temperature value corresponding to an OLED sub-pixel. The temperature value may be transmitted to the controller through a wired or wireless connection. The temperature value may correspond to a measured temperature proximal to a temperature sensor. Alternatively, the temperature value may be an interpolated value determined by the interpolation of temperature values between a first and second temperature sensor.

At step 404, the controller calculates a luminous value corresponding to the sub-pixel. The controller utilizes the temperature sensor and a usage-based age to determine a luminous value of the OLED sub-pixel. The luminous value may correspond to the degree to which the OLED sub-pixel emits light, or alternatively, the degree to which the OLED sub-pixel has degraded. The calculated luminous value may be determined by indexing into a historical database containing entries corresponding to the behavior of OLED sub-pixels' luminosity over time at different operating temperatures.

At step 406, the controller determines a corrected luminous value for the sub-pixel. Based on the calculated luminous value, the controller determines a corrected luminous value for the OLED sub-pixel. The corrected luminous value may correspond to a delta between the calculated luminous value and a predetermined target luminous value. Alternatively, the corrected luminous value may be a non-relative value and instead be an absolute value. The predetermined target luminous value may correspond to a luminosity of the OLED sub-pixel at an earlier point in the sub-pixel's usage.

At step 408, the controller determines a voltage value for the corrected luminous value. Based on the corrected luminous value, the controller may index into a database corresponding to the relationship between luminosity and voltage for OLED sub-pixels. Upon request the database may return a voltage value corresponding to an increase or decrease in voltage to achieve the target luminous value.

At step 410, the controller applies the voltage value to the sub-pixel. The controller applies the voltage value to the sub-pixel. The voltage value may be applied relatively (e.g. in addition) to any current voltage being applied to the OLED sub-pixel. Alternatively, the voltage value may represent an absolute voltage to be applied to the OLED sub-pixel to achieve the target luminous value.

Figure 5:
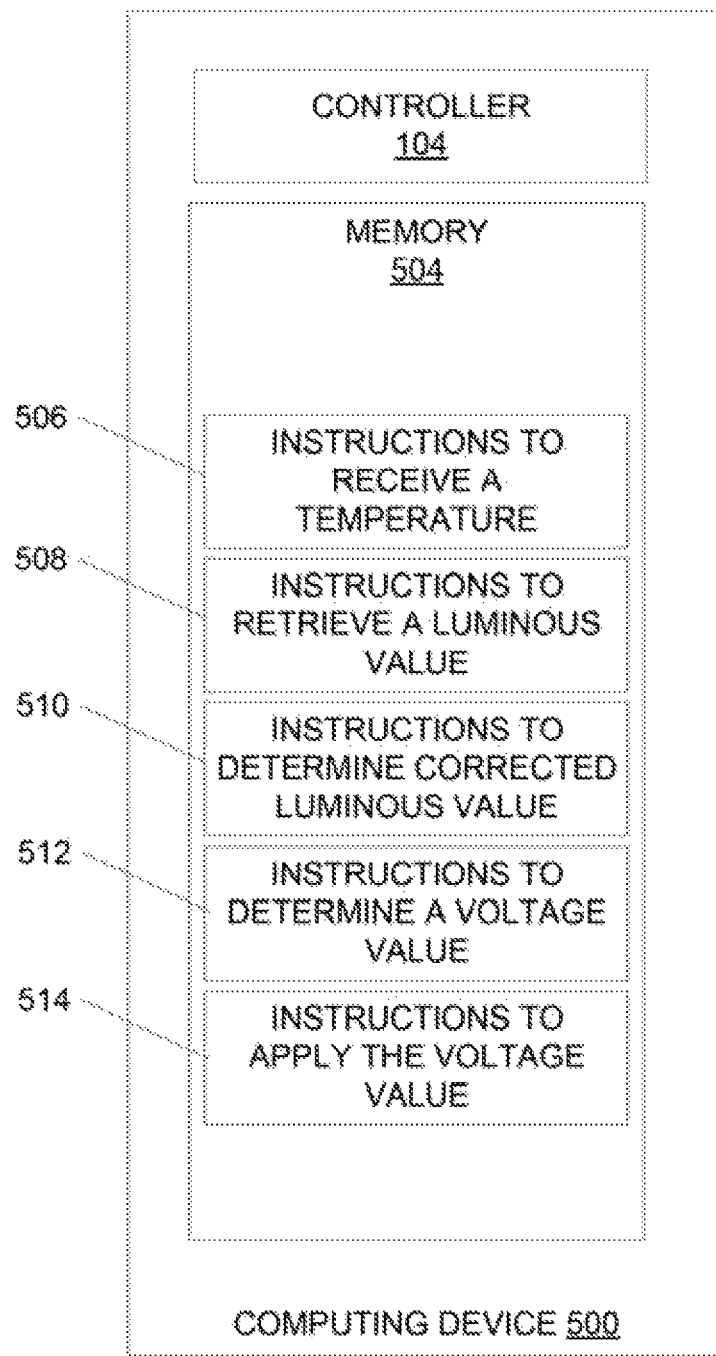
FIG. 5 is a diagram of a computing device to correct OLED sub-pixel luminosity based on temperature, according to an example.

FIG. 5 is a diagram of a computing device to correct OLED sub-pixel luminosity based on temperature, according to an example.

The computing device 500 depicts a controller 104 and a memory 504 and, as an example of the computing device 500 performing its operations, the memory 504 may include instructions 506-514 that are executable by the controller 104. Thus, memory 504 can be said to store program instructions that, when executed by controller 104, implement the components of the computing device 500. The executable program instructions stored in the memory 504 include, as an example, instructions to receive a temperature 506, instructions to retrieve a luminous value 508, instructions to determine a corrected luminous value 510, instructions to determine a voltage value 512, and instructions to apply the voltage value 514.

Memory 504 represents generally any number of memory components capable of storing instructions that can be executed by controller 104. Memory 504 is non-transitory in the sense that it does not encompass a transitory signal but instead is made up of at least one memory component configured to store the relevant instructions. As a result, the memory 504 may be a non-transitory computer-readable storage medium. Memory 504 may be implemented in a single device or distributed across devices. Likewise, the controller 104 represents any number of processors capable of executing instructions stored by memory 504. The controller 104 may be integrated in a single device or distributed across devices. Further, memory 504 may be fully or partially integrated in the same device as the controller 104, or it may be separate but accessible to that device and controller 104.

In one example, the program instructions 506-514 can be part of an installation package that when installed can be executed by controller 104 to implement the components of the computing device 500. In this case, memory 504 may be a portable medium such as a CD, DVD, or flash drive or a memory maintained by a server from which the installation package can be downloaded and installed. In another example, the program instructions may be part of an application or applications already installed. Here, memory 504 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising:
an organic light emitting diode (OLED) display, wherein the display is an array of sub-pixels;
a plurality of temperature sensors disposed within the array of sub-pixels to measure a respective temperature value corresponding to each sub-pixel of the array of sub-pixels;
a controller communicatively coupled to the plurality of temperature sensors, the controller to:
receive the respective temperature value corresponding to each sub-pixel of the array of sub-pixels;
determine a present luminous value of each sub-pixel of the array of sub-pixels, wherein a present luminous value of a sub-pixel of the array of sub-pixels is determined by extracting the present luminous value from a first database correlating a plurality of historical laboratory measured temperatures and a plurality of corresponding historical laboratory measured luminosity values of an OLED sub-pixel over time;
determine a corrected luminous value of each sub-pixel of the array of sub-pixels, wherein a corrected luminous value of the sub-pixel of the array of sub-pixels is determined by determining a difference between the determined present luminous value of the sub-pixel and a targeted luminous value for the sub-pixel;
determine a voltage value to apply to each sub-pixel of the array of sub-pixels to cause each sub-pixel of the array of sub-pixels to reach a corresponding targeted luminous value, wherein a voltage value of the sub-pixel of the array of sub-pixels is determined by extracting a targeted applied voltage value to produce the corrected luminous value from a second database correlating historical laboratory measured luminosity values and a plurality of corresponding applied voltage values of the OLED sub-pixel and determining a difference between a presently applied voltage producing the present luminous value and the targeted applied voltage value to produce the corrected luminous value; and
apply the determined voltage value to the sub-pixel.

2. The system of claim 1, wherein the plurality of temperature sensors include a temperature sensor disposed at an edge of the display and a received temperature value of the sub-pixel is based on an interpolation between a first temperature value from the temperature sensor and a second temperature value from a second temperature sensor disposed on the display.

3. The system of claim 2, wherein the second temperature sensor is disposed on an opposite edge of the display from the temperature sensor.

4. The system of claim 2, wherein wherein the interpolation is a linear interpolation to determine an approximate temperature for the sub-pixel based on a distance between the first temperature sensor, the second temperature sensor, and the sub-pixel.

5. The system of claim 1, wherein the database comprises functional extrapolated values of luminosity over time and temperature, wherein the functionally extrapolated values correspond to sub-pixel decay over time under a variety of temperature conditions.

6. The system of claim 1, wherein
the second database resides remotely from the system and wherein the second database periodically receives updated luminosity and voltage values comprises a luminous-voltage relationship.

7. A method comprising:
receiving a temperature value, from a temperature sensor corresponding to a sub-pixel in an organic light emitting display comprising an array of sub-pixels;
calculating a present luminous value of the sub-pixel by extracting the present luminous value from a first database correlating a plurality of historical laboratory measured temperature values and a plurality of corresponding historical laboratory measured luminosity values of an OLED sub-pixel over time;
determining a corrected luminous value of the sub-pixel by determining a difference between the determined present luminous value of the sub-pixel and a targeted luminous value for the sub-pixel;
determining a voltage value by extracting a targeted applied voltage value to produce the corrected luminous value from a second database correlating historical laboratory measured luminosity values and a plurality of corresponding applied voltage values of the OLED sub-pixel and determining a difference between a presently applied voltage producing the present luminous value and the targeted applied voltage value to produce the corrected luminous value and
applying the determined voltage value to the sub-pixel.

8. The method of claim 7, wherein the temperature sensor is disposed at an edge of the display and the received temperature value is based on an interpolation between a first temperature value from the temperature sensor and a second temperature value from a second temperature sensor disposed on the display.

9. The method of claim 8, wherein the second temperature sensor is disposed on an opposite edge of the display from the temperature sensor.

10. The method of claim 9, wherein the temperature sensor and the second temperature sensor are disposed outside a perimeter of the display.

11. The method of claim 7, wherein the present luminous value is calculated utilizing a degradation function comprising a curve function based on the plurality of historical laboratory measured temperatures and the plurality of corresponding historical laboratory measured luminosity values over time.

12. The method of claim 7, wherein the first database comprises functional extrapolated values of luminosity over time and temperature.

13. A computing device comprising:
a controller;
a memory, communicatively coupled to the controller, having instructions stored thereon that when executed cause the controller to:
receive a temperature value from a temperature sensor corresponding to a sub-pixel;
determine from a first database a present luminous value of the sub-pixel based on the received temperature value by extracting the present luminous value from the first database correlating a plurality of historical laboratory measured temperature values and a plurality of corresponding historical laboratory measured luminosity values of an OLED sub-pixel over time;
determine a corrected luminous value of the sub-pixel by determining a difference between the determined present luminous value of the sub-pixel and a targeted luminous value for the sub-pixel;
determine a voltage value by extracting a targeted applied voltage value to produce the corrected luminous value from a second database correlating historical laboratory measured luminosity values and a plurality of corresponding applied voltage values of the OLED sub-pixel and determining a difference between a presently applied voltage producing the present luminous value and the targeted applied voltage value to produce the corrected luminous value; and
apply the determined voltage value to the sub-pixel.

14. The computing device of claim 13, wherein the temperature sensor is disposed at an interior to an edge of a display comprising an array of sub-pixels including the sub-pixel and the received temperature value is based on an interpolation between a first temperature value from the temperature sensor and a second temperature value from a second temperature sensor disposed on the display.

15. The computing device of claim 13, wherein the second temperature sensor is disposed on interior to an edge of the display from the temperature sensor.

* * * * *